United States Patent
Davies et al.

(10) Patent No.: US 8,863,454 B2
(45) Date of Patent: Oct. 21, 2014

(54) PULTRUDED PART FOR USE AS A FRAME MEMBER FOR AN EXTERIOR WALL CONSTRUCTION FOR A BUILDING

(75) Inventors: Laurence W. Davies, Winnipeg (CA); Matthew David de Witt, Stony Mountain (CA)

(73) Assignee: Omniglass SCT Inc., Winnipeg, MB (CA)

( * ) Notice: Subject to any disclaimer, the term of this patent is extended or adjusted under 35 U.S.C. 154(b) by 949 days.

(21) Appl. No.: 12/271,294

(22) Filed: Nov. 14, 2008

(65) Prior Publication Data

US 2010/0122503 A1    May 20, 2010

(51) Int. Cl.
| | |
|---|---|
| *E04H 1/00* | (2006.01) |
| *E04H 3/00* | (2006.01) |
| *E04H 5/00* | (2006.01) |
| *E04H 6/00* | (2006.01) |
| *E04H 14/00* | (2006.01) |
| *E06B 3/54* | (2006.01) |
| *B32B 5/12* | (2006.01) |
| *E04B 2/88* | (2006.01) |

(52) U.S. Cl.
CPC ............... *B32B 5/12* (2013.01); *E06B 3/5427* (2013.01); *E04B 2/885* (2013.01)
USPC .............................. 52/235; 52/236.3; 52/309.1

(58) Field of Classification Search
CPC ............... E04B 1/28; E04B 1/30; E04B 2/88; E04B 2/885; E04B 2/90; E04B 2/96; E04B 2/967; E06B 3/5427; E04C 2/20; B32B 5/12
USPC ............... 52/281, 282.2, 282.5, 258.2, 309.1, 52/424, 426, 428, 483.1, 489.2, 272, 274, 52/234, 235, 236.3, 238.1
See application file for complete search history.

(56) References Cited

U.S. PATENT DOCUMENTS

| | | | | |
|---|---|---|---|---|
| 3,336,707 | A * | 8/1967 | Horgan, Jr. ..................... | 52/281 |
| 5,324,377 | A | 6/1994 | Davies | |
| 5,592,795 | A * | 1/1997 | Rinehart et al. ................ | 52/235 |
| 5,687,524 | A * | 11/1997 | Ting .............................. | 52/461 |
| 6,746,747 | B2 | 6/2004 | Davies | |
| 6,872,273 | B2 * | 3/2005 | Davies et al. ................. | 156/148 |
| 2003/0026943 | A1 * | 2/2003 | Davies et al. ................. | 428/113 |
| 2003/0115820 | A1 * | 6/2003 | Assadi et al. .................. | 52/578 |
| 2003/0126812 | A1 * | 7/2003 | Folsom et al. ............. | 52/204.62 |
| 2006/0201084 | A1 * | 9/2006 | Arias .............................. | 52/235 |
| 2007/0199261 | A1 * | 8/2007 | Lang ........................... | 52/204.5 |

FOREIGN PATENT DOCUMENTS

WO    PCT/WO78529 A1    12/2000

* cited by examiner

*Primary Examiner* — Joshua J Michener
*Assistant Examiner* — Theodore Adamos
(74) *Attorney, Agent, or Firm* — Adrian D. Battison; Ade & Company Inc.

(57) ABSTRACT

A building curtain wall is formed by vertical frame members carrying panels of glass bridging the space between the members so that edges of the panels are mounted on the members. Each frame member is a hollow pultruded member defined by a thermo-set resin reinforced by reinforcing fibers including longitudinal rovings and a mat located at an exposed surface of the inner wall and the side walls of the generally rectangular member. The exterior surface is defined by the resin which is pigmented but uncoated. In order to provide a required finish to the exterior surfaces the inner wall and the side walls have a thickness of at least 0.090 inch with a difference in thickness therebetween which is less than 20%.

19 Claims, 4 Drawing Sheets

PULTRUDED PART FOR USE AS A FRAME MEMBER FOR AN EXTERIOR WALL CONSTRUCTION FOR A BUILDING

This invention relates to a pultruded part arranged for use as a frame member for an exterior wall construction for a building where the construction includes a plurality of side by side parallel vertical frame members defining spaces therebetween and a plurality of panels each bridging the space between two of the frame members and each having side edges thereof connected to and mounted on a mounting structure of two adjacent ones of the frame members such that the panels cooperate to form an exterior sheet of the wall structure with the frame members mounted inwardly of the exterior sheet to support the exterior sheet. Such exterior wall construction can be of the type known as a curtain wall where the frame members bridge more than one storey of a multi-storey building or of the type known as a storefront where the frame members span only a single storey and define a frame arrangement inserted into an opening in a wall of the building.

BACKGROUND OF THE INVENTION

Pultrusion is a technique in which longitudinally continuous fibrous structures are used to pull a resin through a die so that the resin sets and produces a rigid part downstream of the die to which the pulling force is applied.

Originally the longitudinal fibres consisted of simply longitudinal in the extending rovings and the parts were of a relatively simple cross section such as rods, T-bars and the like. However developments have been introduced to reduce the wall thickness of the parts so that complex cross sections including hollow cross sections could be manufactured. In order to achieve the necessary strength of the parts, it was necessary to introduce transverse fibers to provide strength in the transverse direction. Such transverse fibers are conventionally applied using a mat of a woven or non woven material. In many cases the fibers in the mat are generally random so that the number of fibers extending in the transverse direction is relatively small. One major problem with the mat is that it is relatively expensive and can be very expensive so that it is more than double per pound of the cost of the simple conventional rovings. One direction of development has been to provide improved mats which apply more of the fibers in the transverse direction thus allowing the mat to be of reduced thickness to provide the required strength or toughness in the finished part. An example of a mat tailored for pultrusion is shown in published International application PCT/WO78529A1 published 28 Dec. 2000 and assigned to Pella.

An alternative approach to the expense of the mat is to attempt to attach to the longitudinal rovings some transverse fibers which are simply chopped roving material. One example of an arrangement of this type is shown in U.S. Pat. No. 5,324,377 of the present inventor Davies. This method of pultrusion attempted to attach transverse fibers to the outside of a body of longitudinal rovings so as to be carried through the die with the rovings. This method has to date not achieved commercial success.

In order to minimize material costs, commercial pultrusion is normally carried out using polyester as the resin which is a simple thermo-set resin material so that it can be applied to the fibers from a bath and is thermo-set within the heated die. However other resins can be used.

Mats for reinforcing pultruded parts are provided to add structural strength and in order to provide the required or expected amount of strength have a weight of fibers greater than 0.5 ounces per square foot and generally 0.75 to 1.0 ounces per square foot Veils, which are used to provide surface characteristics and not to provide any structural strength are lighter, generally less than 0.5 ounces per square foot and typically of the order of 0.1 ounces per square foot. Conventional veils are used outside rovings or outside mats at the surface to increase the amount of resin located outside the mat and locate generally finer fibers at the surface to provide an improved surface appearance or to retain the stiffer glass fibers within the resin to prevent fiber "bloom" or projecting fibers which can act as slivers. This latter requirement to prevent slivers is particularly important in tool handles or similar products. The retention of fibers to prevent weathering or bloom is particularly important in fenestration or similar products. Veils are well known and well used, when required for the part concerned, by persons skilled in this art and are not intended to form part of and are not considered as part of the fiber reinforcement.

In U.S. Pat. No. 6,746,747 (Davies) of the present Applicants issued Jun. 8, 2004 is disclosed using a resin which can include non-linear resins such as urethane or polyester material and reinforcing fiber layers including at least one first layer of fibers having fibers extending only in the longitudinal pultrusion direction and one or more second layers, where the second layer consist of a pre-formed mat or veil having a total quantity of fibers in the layer which is of the order of or less than 0.5 ounces per square foot. The mat layer can be located in the pultruded wall so that it is on the inside surface of a hollow or in a central position between two layers of unidirectional rovings. The disclosure of the above Davies patent is incorporated herein by reference to provide details of pultrusion methods.

Curtain wall is a term used to describe a building façade which does not carry any dead load from the building other than its own dead load. These loads are transferred to the main building structure through connections at floors or columns of the building. A curtain wall is designed to resist air and water infiltration, wind forces acting on the building, seismic forces (usually only those imposed by the inertia of the curtain wall), and its own dead load forces.

Curtain walls differ from storefront systems in that they are designed to span multiple floors, and take into consideration design requirements such as: thermal expansion and contraction; building sway and movement; water diversion; and thermal efficiency for cost-effective heating, cooling, and lighting in the building.

The first curtain walls were made with steel mullions, and the plate glass was attached to the mullions with asbestos or fiberglass modified glazing compound. Later silicone sealants or glazing tape were substituted. Some designs included an outer cap to hold the glass in place and to protect the integrity of the seals. The 1970's began the widespread use of aluminum extrusions for mullions. Aluminum offers the unique advantage of being able to be easily extruded into nearly any shape required for design and aesthetic purposes.

Similarly, sealing methods and types have evolved over the years, and as a result, today's curtain walls are high performance systems which require little maintenance.

In addition to providing an aesthetic appearance for the sides of a modern multi-story building, some of the major performance objectives of a curtain wall system of supported panels are as follows:

to provide a barrier or at least resistance to excessive amounts of exterior air infiltrating around the edges of panels into one or more interior environments within the building;

to provide a barrier or at least resistance to excessive amounts of exterior rain or other exterior liquids/particles infiltrating around the panel edges into one or more interior spaces within the building, typically when the liquids or particles tend to infiltrate in conjunction with air infiltration;

to provide a coefficient of expansion which is close to that of glass so as to reduce or remove the necessity to provide the expansion joints which are necessary with aluminum bearing in mind that the frame members can span several floors of a building.

to provide resistance to structural loads, specifically including supporting the weight of the panels and resisting seismic loads, wind loads, and thermal expansion/contraction loads, if any; and to provide a thermal barrier or at least resistance to excessive heat transfer between the exterior air and one or more interior environments.

Typically therefore current frame members for the curtains walls are manufactured of extruded aluminum. This can be coated with a paint or can be simply anodized to provide a suitable finish. The frame members are typically rectangular in cross section with an inner wall and side walls inside the outer sheathing of the building and the outer sheathing attached to an outer mounting portion of the frame member However aluminum has many disadvantages in that it is susceptible to scratching and marring whether anodized or painted, it has high heat conductivity and its coefficient of thermal expansion is very different from that of glass.

SUMMARY OF THE INVENTION

It is one object of the present invention, therefore, to provide a frame member for an exterior wall construction for a building which is manufactured as a pultruded part.

According to a first aspect of the invention, therefore, there is provided an exterior wall construction for a building comprising:

a plurality of side by side parallel vertical frame members defining spaces therebetween;

each frame member being shaped to define a hollow structural member having an inner wall facing inwardly of the building, two side walls and an outer mounting structure facing outwardly of the building;

a plurality of panels each bridging the space between two of the frame members and each having side edges thereof connected to and mounted on the mounting structure of two adjacent ones of the frame members such that the panels cooperate to form an exterior sheet of the wall structure with the frame members mounted inwardly of the exterior sheet to support the exterior sheet;

each frame member comprising a pultruded member defined by a thermo-set resin reinforced by reinforcing fibers;

the reinforcing fibers including at least one first layer of fibers having fibers extending only in a direction longitudinal of the members;

the reinforcing fibers including at least one second layer of fibers having fibers with at least portions thereof extending transverse to the longitudinal direction and located in the member so as to be positioned at or adjacent an exposed surface of the inner wall and the side walls;

each frame member having an exterior surface defined by the resin so as to be free from coating material;

wherein the inner wall and the side walls each have a thickness of at least 0.090 inch;

and wherein the inner wall and the side walls have thicknesses selected such that a difference in thickness therebetween is less than 20%.

Typically the panels are arranged perpendicular to the frame members so as to span the frame members and form a front surface for the building. The panels are typically formed of a UV reflecting or absorbing glass. However other materials can be used and particularly panels of aluminum or other non-transparent material are used to cover part of the face of the building particularly at the space between the ceiling and floor.

Preferably the resin contains a pigment to provide a coloring thereto.

Preferably the inner wall and the side walls have thicknesses selected such that a difference in thickness therebetween is less than 15% and preferably of the order of or less than 10%. Thus the inner wall and the side walls are substantially of the same thickness with the variation being only that which is typical in normal tolerances obtainable in pultrusion where the thickness cannot be maintained highly accurately due to the floating movement of the mandrel used in forming the interior shape of a hollow. Typically 10% variation is the best that can be achieved and variations as much as 20% can be accepted in some constructions.

The use of thicker walls in the pultrusion process provides enhanced surface finish characteristics since the mat fibers which can mar the appearance by providing visible fiber lines In one construction the exterior wall construction forms a curtain wall of a multi-storey building in which the frame members span more than one storey.

In another construction the same frame members can be used in an arrangement where the frame members span only a single storey and define a frame arrangement inserted into an opening in a wall of the building, such as in the construction known as "storefront". The frame members described herein can be used in either arrangement.

Preferably the thickness of the inner wall and the side walls lies in the range 0.090 inch to 0.50 inch. More preferably the thickness is in the range 0.17 to 0.25 inch and particularly a specific thickness of 0.20 inch has been found to be effective in certain embodiments In one preferred arrangement, the second layer of fibers at or adjacent the exposed surface of the inner wall and the side walls consists of a single preformed mat.

In this arrangement, the mat typically has a weight in the range 0.125 to 3.0 oz/sq ft. More preferably the weight is in the range 0.75 to 1.5 oz/sq ft.

In another preferred arrangement, the second layer of fibers at or adjacent the exposed surface of the inner wall and the side walls consists of a preformed mat and a preformed veil located externally of the mat.

In this arrangement, the mat typically has a weight in the range above and the veil has a weight in the range 0.06 to 0.75 oz/sq ft.

Preferably each of the members is substantially rectangular in cross section so the sides are parallel and the inner wall is at right angles thereto.

There may be provided a cross wall at right angles to the side walls between the inner wall and the mounting structure.

Preferably for low cost the resin is polyester.

However other resins can be used for example the polyurethane described in the above Davies patent.

Typically the reinforcing fibers will include a third layer of mat fibers, that is those having fibers with at least portions thereof extending transverse to the longitudinal direction, which is located in the member so as to be positioned at or adjacent an inner surface of the inner wall and the side walls.

The advantage of the present invention is that it provides a low cost corrosion resistant part using the known process of pultrusion where the exterior surface is defined by the pigmented resin itself without any additional coating or paint layer. Such coatings can be scratched or marred leading to a poor appearance. The resin itself has been found to provide an effective exterior layer provided the wall thicknesses are of the minimum defined and are of substantially equal thickness as defined since uniform wall thickness gives a uniform mat print through or visibility of the fibers at the surface. Thus the mat or reinforcing fibers at the surface takes up an appearance at the outer resin surface which is attractive and consistent thus avoiding the necessity of the application of a coating, which requires additional cost and can be scratched.

Many standards are available for fenestration parts including standards provide by ASTM which are Government generated standards, and by AAMA which is the American Architectural Manufacturers Association. It has been found that the surface provide by the present invention can have better qualities than other available materials in tests such as:

The Pencil Hardness where the present invention provides values of at least 4H and up to 6H (ASTM D3363);

Adhesion of 5B (ASTM-03359-90)

Chemical resistance of 100 double rubs (ASTM D4752)

Taber Abrasion less than 100 mg loss in 1000 cycles (ASTM D4060).

Other more extensive tests of the AAMA can also be met by the arrangement of the present invention.

Typically the product according to the present invention has a cost approximately equal to that of aluminum.

Typically uncoated pultruded parts cannot be used for fenestration products and are specifically stated to be unacceptable for such uses according to Codes in view of the inability of pultruded parts to withstand UV degradation unless properly coated. It has been realized that the present arrangement is acceptable even though it forms a typical fenestration part since the part is in face wholly internal and does not present an externally exposed portion because that portion is covered by the cladding panels.

According to a second aspect of the invention there is provided an exterior wall construction for a building comprising:

a plurality of side by side parallel vertical frame members defining spaces therebetween;

each frame member being shaped to define a hollow structural member having an inner wall facing inwardly of the building, two side walls and an outer mounting structure facing outwardly of the building;

a plurality of panels each bridging the space between two of the frame members and each having side edges thereof connected to and mounted on the mounting structure of two adjacent ones of the frame members such that the panels cooperate to form an exterior sheet of the wall structure with the frame members mounted inwardly of the exterior sheet to support the exterior sheet;

each frame member comprising a pultruded member defined by a thermo-set resin reinforced by reinforcing fibers;

each frame member having an exterior surface defined by the resin so as to be free from coating material;

wherein the inner wall and the side walls each have a thickness of at least 0.090 inch.

In this arrangement, preferably the reinforcing fibers include at least one first layer of fibers located at an exposed surface of the side walls and the inner wall having fibers extending only in a direction longitudinal of the members.

Preferably the reinforcing fibers also include at least one second mat layer of fibers having fibers with at least portions thereof extending transverse to the longitudinal direction and located in the member so as to be positioned at a position spaced from the exposed surface of the inner wall and the side walls.

The second layer of mat fibers can be located at a position spaced from the exterior surface and from an inner surface of the inner wall and the side walls or the second mat layer can be located at a position at an inner surface of the inner wall and the side walls.

According to a third aspect of the invention there is provided a pultruded lineal for use in an exterior wall construction for a building comprising;

a pultruded member defined by a thermo-set resin reinforced by reinforcing fibers;

the pultruded member being a hollow structural member having an inner wall for facing inwardly of the building, two side walls and an outer mounting structure for facing outwardly of the building;

the reinforcing fibers including at least one first layer of fibers having fibers extending only in a direction longitudinal of the member;

the reinforcing fibers including at least one second layer of fibers having fibers with at least portions thereof extending transverse to the longitudinal direction and located in the member so as to be positioned at or adjacent an exposed surface of the inner wall and the side walls;

the frame member having an exterior surface defined by the resin so as to be free from coating material;

wherein the inner wall and the side walls each have a thickness of at least 0.090 inch;

and wherein the inner wall and the side walls have thicknesses selected such that a difference in thickness therebetween is less than 20%.

The transverse layer thus may be a scrim or mesh having openings for penetration of the resin between the fibers so as to allow effective cross-linking of the resin. It has also been found that surprisingly a veil of staple polyester fibers having a weight of as low as 0.1 oz/square foot can provide the required additional strength and/or toughness to the product.

The mat layer may be formed of any suitable fibers including but not limited to glass fibers, carbon fibers polymer fibers such as polyester or aramids, metal strands such as aluminum or steel or natural fibers such as cotton, jute, hemp or flax.

Natural fibers such as flax have the advantage that they are inexpensive and are to some extent porous thus allowing the resin to enter the interstices in the fibers and providing an increased bond between the fibers and the resin which can lead to reduced de-lamination and thus increased strength.

Metal strands have the advantage that they provide the required additional strength and/or toughness in the intermediate layer, but also they can provide other functions such as the required ferromagnetic effect for magnetic coupling as shown for example in U.S. Pat. No. 5,129,184 (Fish) issued Jul. 14, 1992 and/or an electrostatic charging effect for electrostatic deposition of a coating or paint material.

In one advantageous arrangement, the transverse fibers are formed of metal strands which provide both transverse strength and the characteristic of electrical conductivity and/or ferromagnetism for the part.

BRIEF DESCRIPTION OF THE DRAWINGS

Embodiments of the invention will now be described in conjunction with the accompanying drawings, in which.

DETAILED DESCRIPTION

Figure 1:
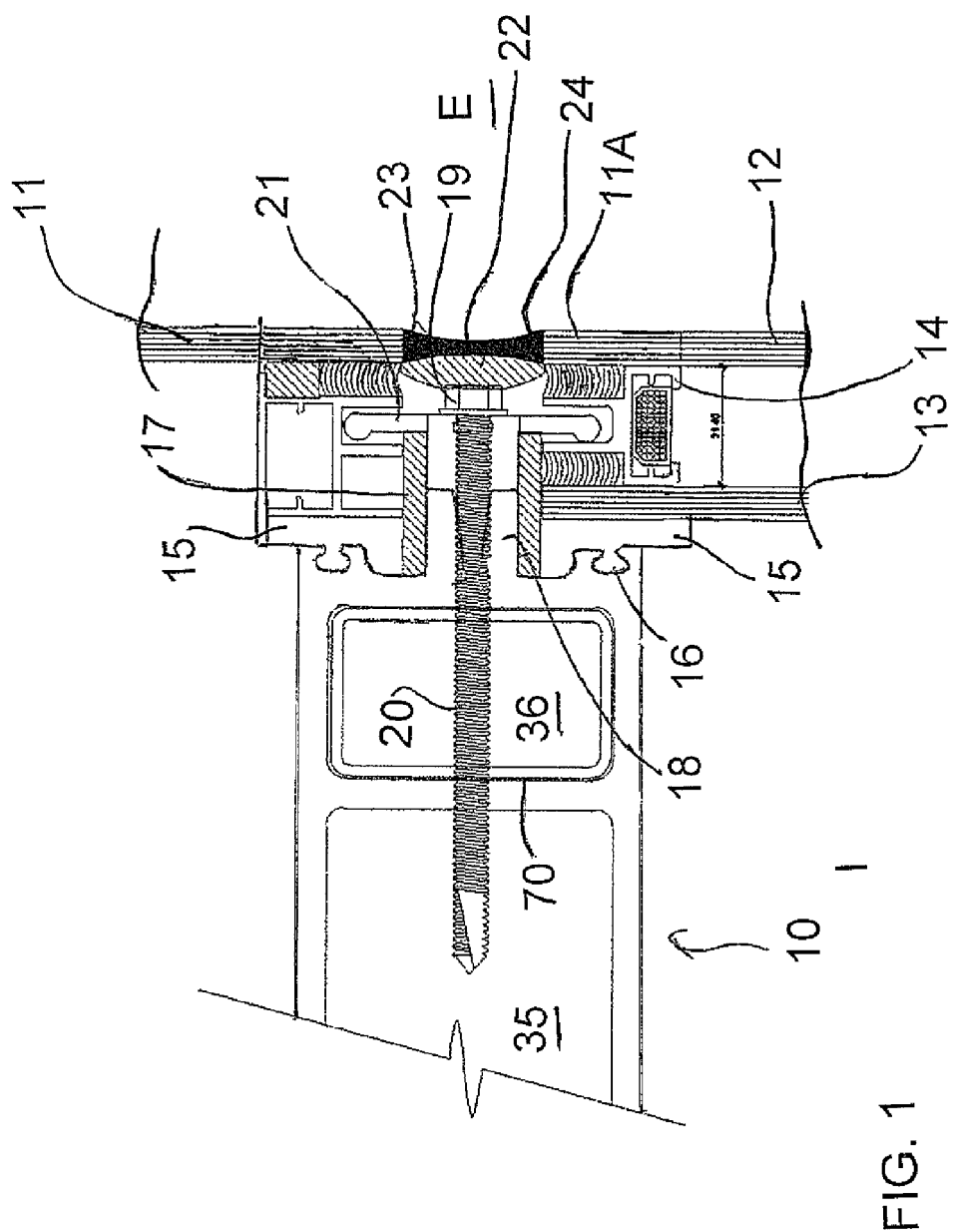
FIG. 1 is a cross sectional view of typical curtain wall construction including a pultruded part defining the frame member according to the present invention.

In FIG. 1 is shown in cross section one part of a curtain wall system including one frame member 10 of a series of such frame members which are arranged in parallel spaced relationship along an open front face of a building. Attached across the space between each frame member 10 and the next adjacent frame member is a plurality of panels 11. The panels 11 meet at the frame member 10 so that two such panels 11 and 11A have edges which are closely adjacent and overlie the frame member 10. The panels are arranged perpendicular to the frame members so as to span the frame members and form a front surface for the building. The panels are typically a UV reflecting or absorbing glass with panels of aluminum or other non-transparent material used to cover part of the face particularly at the space between the ceiling and floor.

Many different designs of the frame members and panels are available in the art and it will be appreciated that the present invention can utilize many such different arrangements.

The present invention is primarily concerned with the construction of the frame member 10 as described in more detail hereinafter.

In the embodiment shown, the panel 11A includes an outer sheet 12 of glass and an inner sheet 13 of glass which are held in spaced position by a central spacer 14 to form a sealed window unit. The glass sheets are held against the spacer 14 by a suitable adhesive materials so that the glass sheets are held at the required spacing and are held together as a structural member by the spacer 14.

A rubber spacer 15 is positioned between the inner sheet 13 of glass and an outside surface of the frame member 10. The rubber spacer includes keying elements 16 which hold the spacer in engagement with the outer face of the frame member. A setting block 17 is located on a cylindrical protuberance 18 of the outer face of the frame member and defines a sleeve for receiving a fastener 19 including a screw thread section 20. A mounting flange 21 engages against a portion of the panel 12 and holds that portion pressed against the setting block 17. The mounting flange 21 is clamped in place by the threaded fastener 19 which extends through the protuberance 18 and into the structure of the frame member 10 as described in more detail hereinafter.

Thus it will be appreciated that the edges of the panels are clamped against the outer face of the frame member so that these edges are held in fixed position against the frame member against movement inwardly and outwardly of the building and against movement away from the frame members.

It will be appreciated that the exterior of the building is beyond the outer glass sheet 11A as indicated at E and the interior of the building is inwardly of the exterior panels as indicated at 1. Thus the panels form the exterior sheet and the frame members 10 are located inwardly of that exterior sheet within the building structure at the opening within the building.

In the arrangement shown in FIG. 1, the mounting flange 21 applies pressure against only the inside sheet 13 of the glass and the outside sheet 12 is held in position by its attachment to the inside sheet. However similar arrangements can be provided which include a tape on the outside so that the pressure is applied against the outer sheet 12. In the embodiment shown a bead 22 of a filler material is located in the space between the edges 23 and 24 of the outer sheets 12.

Figure 2:
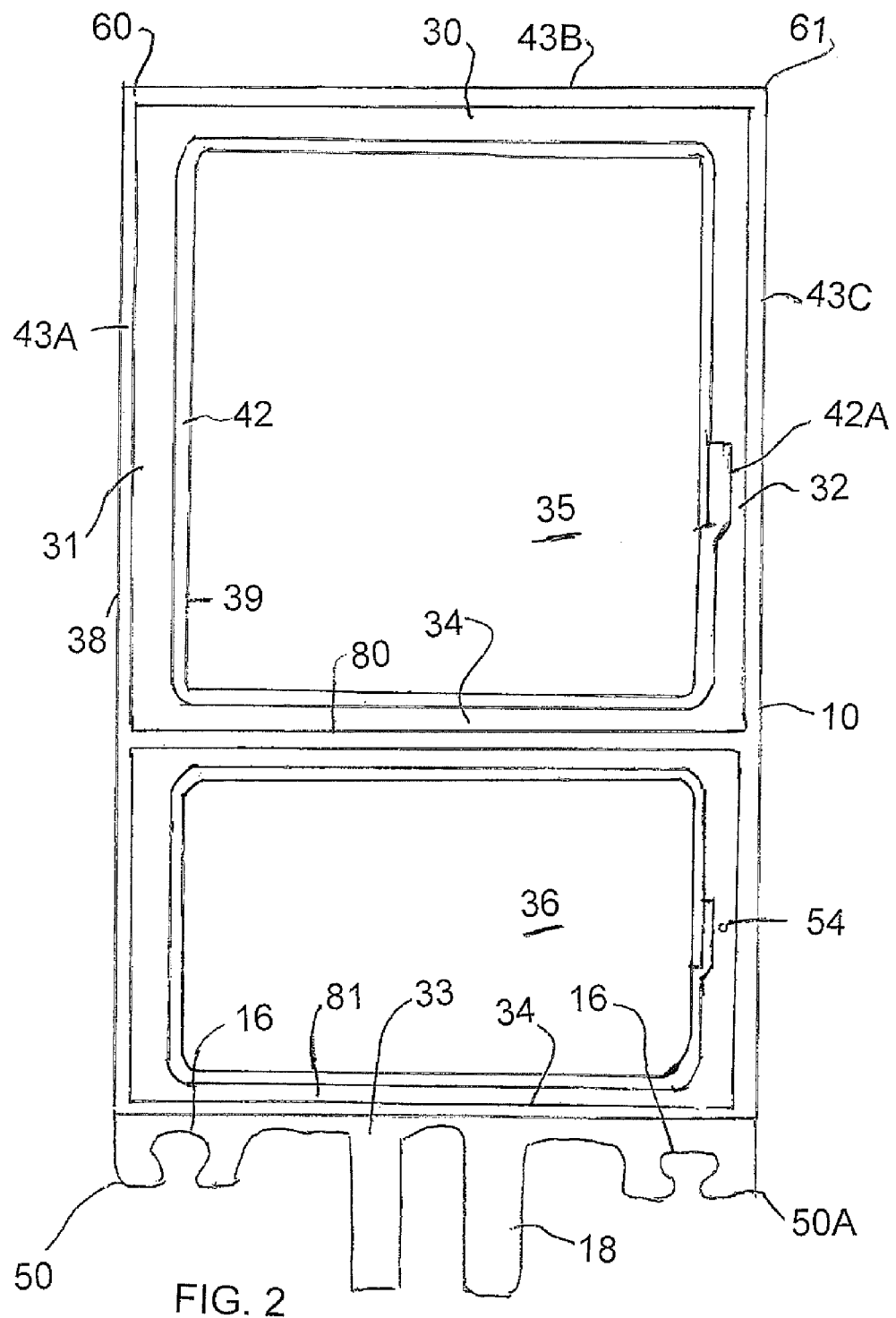
FIG. 2 is a cross sectional view on an enlarged scale of the frame member of FIG. 1.

Turning now to FIG. 2, a cross section of the frame member is shown in more detail with the exterior sheathing panels omitted. The frame member 10 is generally rectangular so as to provide an inner wall 30 and two side walls 31 and 32. The frame member further includes the outwardly facing mounting structure 33 which carries the external sheathing panels. As previously described, this includes keying elements 16 which cooperate with the spacer 15 together with the protuberance 18 along the center of the mounting portion 13. Thus basically the mounting portion 13 includes a wall 34 parallel to the wall 30 and at right angles to the side walls 31 and 32.

It will be appreciated that the shape of the frame members is not necessarily rectangular so that the side walls 31 and 32 may converge or diverge so that the width of the inner wall 30 may be different from the width of the outer wall 33. An additional cross wall 34 parallel to the walls 30 and 33 is provided at a position therebetween so as to define two hollow chambers 35 and 36 within the frame member.

The frame member 10 is formed by cutting a required length from a pultruded lineal. As previously explained pultrusion is a known technique for manufacturing in effect continuously extending parts which are parts of a constant cross section which are then cut to length after the part is set.

When the system is used in a curtain wall construction, typically the frame members are cut to a length so that they span a distance greater than one story of the building on which the curtain wall is applied. Typically the frame members span two such stories and are connected end to end so that the frame member as connected extends from the bottom of the building through to the top of the building or at least through a height of the building on which the curtain wall is intended to be applied. Suitable fastening arrangements for connecting the end of one lineal piece to the next are well known and available to persons skilled in the art.

Figures 3, 4:
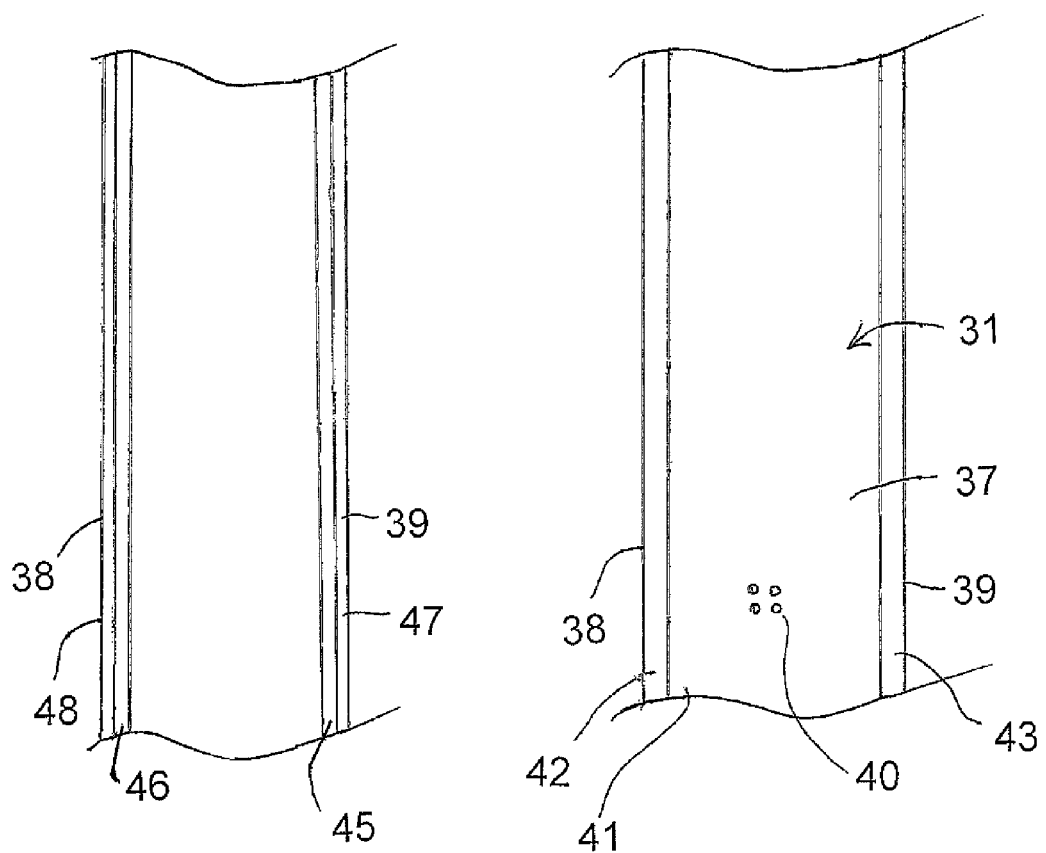
FIG. 3 is a cross sectional view on an enlarged scale of a first embodiment of one wall of the frame member of FIG. 1.
FIG. 4 is a cross sectional view on an enlarged scale of a second embodiment of one wall of the frame member of FIG. 1.

The frame members are fastened to the floor of each story again using bracket arrangements well known to a person skilled in the art Turning now to FIG. 3, a portion of one wall of the frame member 10 is shown as indicated at 31. This wall is formed from a resin material 37 which extends through the whole body of the frame member and thus extends from an exterior surface 38 through the interior of each wall through an interior surface 39 of the frame member. Thus the outside surfaces 38 and 39 are formed from resin material. Inside the wall the resin material is reinforced by reinforcing fibers 40. These reinforcing fibers 40 include a central layer 41 of longitudinally extending rovings together with an outer layer 42 at the surface 38 and an inner layer 43 at the surface 39. The layers 42 and 43 are formed from a pre-formed mat of fibers which include fibers which deviate from the longitudinal direction. Mats of various types can be used including non-woven and woven mats but in most cases non woven mats are used where the fibers are in effect randomly oriented through the structure. This provides strength in two directions as is well known in the pultrusion technique.

In one example as shown in FIG. 2, the mat 42 which is located on the inside surface of the hollow wraps around the whole inside surface with an overlap at the point 42A to form a continuous inner mat. The mat 43 on the outer surface of the part is formed in separate pieces 43A, 43B and 43C. This allows the corner 60 where the mat portions 43A and 43B meet and the corner 61 where the mat portions 43B and 43C meet to be sharper than is typical in pultrusion without forming folds of bends in the mat portions as they enter the pultrusion die.

Sharp corners that are corners of very small radius are preferred in this construction to reduce the gap where the edge of the horizontal frame members meets the corner of the vertical frame members. This radius and the gap formed thereby can also be accommodated by moving the horizontal frame members slightly outwardly by a distance approximately equal to the radius of curvature and taking up the extra distance caused by this movement at the outside edge in the compression of the rubber spacer 15.

In FIG. 1 is shown a metal tube 70 which is inserted into the hollow 36 to act as a screw retention member for holding the screws 20 against pulling out of the pultruded frame member. The tube is inserted in the hollow 36 only at the screws. However it is still an additional component which must be inserted as an extra step and includes additional cost. In FIG. 2, the tube is replaced by an extra layer of mat 81 in the cross member 34 and an extra layer 81 in the outer cross member 33. In both cases the extra layer is inserted approximately mid way between the outer an inner surfaces and thus is spaced from the outer and inner mats.

The shape of the frame member with the inner wall 30 and the side walls 31 and 32 may be rectangular as shown or may be curved so that the side walls smoothly converge into the inner wall and form a part cylindrical shape in the inside facing the interior of the building. In this case, the horizontal frame members may be manufactured of a different pultruded profile having depth from the outer cross-wall to the inner wall which is only sufficient to reach the area where the side walls of the vertical frame members are parallel and before the curvature commences. Thus the horizontal frame members may be of reduced dimension in the direction at right angles to the exterior cladding panels since the strength requirement for the horizontal members is significantly less.

The formation of the part by pultrusion causes the fibers to be contained within the resin body so that the fibers are slightly spaced from the surfaces 38 and 39 thus presenting at the exterior surfaces a structure formed by the resin.

In FIG. 4 is shown an arrangement in which the reinforcing fibers include a mat 45, 46 and an exterior veil layer 47, 48. The positioning of a veil outside the mat at the respective surface 38,39 tends to increase the amount of resin at the surface and to space the coarse fibers of the mat layer from the surface.

The frame member is formed so that the walls 30, 31 and 32 are of substantially the same thickness. Thus the intention is that these walls have identical thickness. However in the pultrusion technique it is well known that the mandrel which forms the hollow can move during the pultrusion process thus changing the thicknesses of the walls. In some cases the walls may vary in thickness so that one of the walls is thicker than the other by up to 20%. It is preferred that the process is sufficiently controlled so that the variations and thickness are less than 15% and preferably less than 10%.

The thickness of the walls is at least 0.090 inch and more preferably in the range of 0.090 inch to 0.5 inch. This thickness of the pultruded wall is relatively thick. It has been found by the present inventors that the selection of the relatively thick wall together with the constant thickness through the walls 30, 31 and 32 provides a situation where the external surface defined by the resin is of a constant appearance. Thus all of the exposed outer surfaces of the walls of the frame member from the edges 50 and 50A at the outer mounting portion through the whole of the side wall 31, the inner wall 30 and the side wall 32 have a constant processing characteristic leading to a constant appearance of the outside surface of the resin.

Yet further the selection of the above characteristics provides for the outside surface of the resin an attractive appearance in which the fibers of the mat are slightly visible but are constrained within the resin so their appearance is of an attractive nature rather than a nature which detracts from the appearance.

It has been found therefore that the above processing characteristics provides a structure in which the outside surface of the resin when carrying a pigment indicated at 54 provides an exterior which is resistant to scratching and yet provides an appearance which is sufficiently attractive to be presented to the public without the necessity for additional coatings.

The resin itself thus provides a hard resistant coating without the possibility of the coating being scratched away. The resin itself is resistant to chipping, scratching and abrasion so that it retains the attractive outside appearance.

Suitable mats which can be used in the present invention are available as follows;

Glass spun-bonded mat with course fiber reinforcement having a weight of 1 oz/sq ft.

This can be used with a veil also of glass having a weight of 0.75 oz/sq ft. The difference between the mat and the veil is that the veil is formed of finer fibers so as to reduce the amount of the appearance of the fiber at the surface and the location of the veil outside the mat means that it provides less strength reinforcement and more resin retention.

The thickness of the mounting portion wall 33 and the cross wall 34 can vary relative to the walls 30, 31 and 32 since these have no outward visibility and thus the surface characteristics can change.

The pultruded member described above provides better scratch resistance and also better chemical resistance than conventional coatings or anodized aluminium.

The frame members are located inwardly of the exterior sheeting. Thus even though the exterior sheeting may be transparent, typically such transparent sheeting includes UV resistant layers or reflective layers so that the frame member is protected against UV degradation caused by the penetration of UV light. However typical UV stabilizers and pigments available for pultrusion and compatible with the resin being used can also be used.

Figure 5:
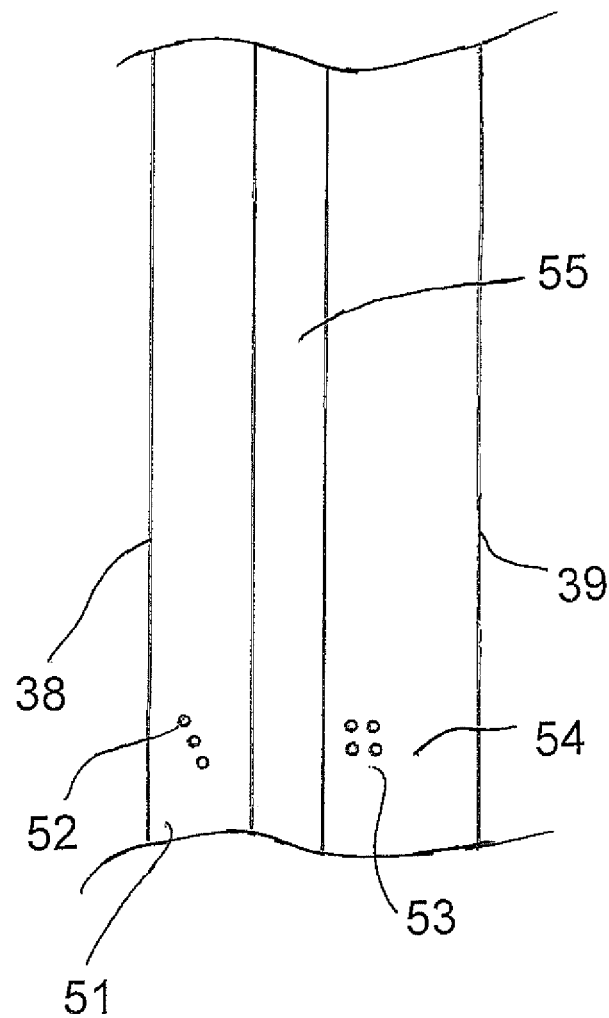
FIG. 5 is a cross sectional view on an enlarged scale of a second embodiment of one wall of the frame member of FIG. 1.

In FIG. 5 is shown alternative arrangement in which the wall is formed again from resin between the surfaces 38 and 39. Again the wall is reinforced by fiber layers but in this case the fiber layers include a layer 51 which is formed from longitudinally extending fibers 52. A second layer of longitudinally extending fibers 53 is provided at layer 54. An additional reinforcing mat layer 55 is provided to provide structural strength. However the roving layers 51 and 54 are located at the surfaces 38 and 39 thus providing a different appearance effect at the surfaces 38 and 39. Such rovings can be provide a wood grain effect in appearance due to the longitudinal nature of the fibers at the surface where they can be seen just below the surface within the resin.

In all cases the thickness of the part is such that the fibers beneath the surface of the resin do not provide significant three dimensional pultrusion through the resin or vary the smoothness of the resin surface and the appearance of the fibers is primarily visual rather than having any relief effect.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An exterior wall construction for a building comprising:
    a plurality of side by side parallel vertical frame members defining spaces therebetween;
    each frame member being shaped to define a hollow structural member having an inner wall facing inwardly of the building, two side walls and an outer mounting structure facing outwardly of the building;
    a plurality of panels each bridging the space between two of the frame members and each having side edges thereof connected to and mounted on the mounting structure of two adjacent ones of the frame members such that the panels cooperate to form an exterior sheet of the wall structure with the frame members mounted inwardly of the exterior sheet to support the exterior sheet;
    the inner wall, side walls and outer mounting structure of each frame member being formed by a pultruded member defined by a thermo-set resin reinforced by reinforcing fibers;
    the reinforcing fibers including at least one first layer of fibers having fibers extending only in a direction longitudinal of the members;
    the reinforcing fibers including at least one second layer of fibers having fibers with at least portions thereof extending transverse to the longitudinal direction and located in the member so as to be positioned at or adjacent an exposed surface of the inner wall and the side walls;
    each frame member having an exterior surface defined by the resin so as to be free from coating material;
    wherein the inner wall and the side walls each have a thickness of at least 0.090 inch;
    and wherein the inner wall and the side walls have thicknesses selected such that a difference in thickness therebetween is less than 20%.

2. The exterior wall construction according to claim 1 wherein the inner wall and the side walls have thicknesses selected such that a difference in thickness therebetween is less than 15%.

3. The exterior wall construction according to claim 1 wherein the inner wall and the side walls have thicknesses selected such that a difference in thickness therebetween is less than 10%.

4. The exterior wall construction according to claim 1 wherein the exterior wall construction forms a curtain wall of a multi-storey building in which the frame members span more than one storey.

5. The exterior wall construction according to claim 1 wherein the frame members span only a single storey and define a frame arrangement inserted into an opening in a wall of the building.

6. The exterior wall construction according to claim 1 wherein the thickness of the inner wall and the side walls lies in a range of 0.090 inch to 0.5 inch.

7. The exterior wall construction according to claim 1 wherein the second layer of fibers at or adjacent the exposed surface of the inner wall and the side walls consists of a single preformed mat.

8. The exterior wall construction according to claim 7 wherein the mat has a weight in a range of 0.125 to 3.0 oz/sq ft.

9. The exterior wall construction according to claim 1 wherein the second layer of fibers at or adjacent the exposed surface of the inner wall and the side walls consists of a preformed mat and a preformed veil located externally of the mat.

10. The exterior wall construction according to claim 9 wherein the mat has a weight in a range of 0.125 to 3.0 oz/sq ft and the veil has a weight in a range of 0.06 to 0.75 oz/sq ft.

11. The exterior wall construction according to claim 1 wherein each of the members is substantially rectangular in cross section so the sides are parallel and the inner wall is at right angles thereto.

12. The exterior wall construction according to claim 1 wherein there is provided a cross wall at right angles to the side walls between the inner wall and the mounting structure.

13. The exterior wall construction according to claim 1 wherein the resin is polyester.

14. The exterior wall construction according to claim 1 wherein the reinforcing fibers including a third layer of fibers having fibers with at least portions thereof extending transverse to the longitudinal direction and located in the member so as to be positioned at or adjacent an inner surface of the inner wall and the side walls.

15. An exterior wall construction for a building comprising:
    a plurality of side by side parallel vertical frame members defining spaces therebetween;
    each frame member being shaped to define a hollow structural member having an inner wall facing inwardly of the building, two side walls and an outer mounting structure facing outwardly of the building;
    a plurality of panels each bridging the space between two of the frame members and each having side edges thereof connected to and mounted on the mounting structure of two adjacent ones of the frame members such that the panels cooperate to form an exterior sheet of the wall structure with the frame members mounted inwardly of the exterior sheet to support the exterior sheet;
    the inner wall, side walls and outer mounting structure of each frame member being formed by a pultruded member defined by a thermo-set resin reinforced by reinforcing fibers at least some of which are rovings which extend longitudinally along the member;
    each frame member having an exterior surface defined by the resin so as to be free from coating material;
    wherein the inner wall and the side walls each have a thickness of at least 0.090 inch.

16. The exterior wall construction according to claim 15 wherein the exterior wall construction forms a curtain wall of a multi-storey building in which the frame members span more than one storey.

17. The exterior wall construction according to claim 15 wherein the frame members span only a single storey and define a frame arrangement inserted into an opening in a wall of the building.

18. The exterior wall construction according to claim 15 wherein the thickness of the inner wall and the side walls lies in a range of 0.090 inch to 0.5 inch.

19. The exterior wall construction according to claim 15 wherein each of the members is substantially rectangular in cross section so the sides are parallel and the inner wall is at right angles thereto.

* * * * *